Patented Feb. 1, 1927.

1,616,131

UNITED STATES PATENT OFFICE.

CARL FREDRIK KULLGREN AND SVEN GUSTAF LIND, OF STOCKHOLM, SWEDEN.

PROCESS FOR PRODUCING PURE SUGAR LIQUORS.

No Drawing. Application filed October 5, 1925, Serial No. 60,690, and in Sweden May 13, 1925.

This invention refers to a new and useful improvement in process for purifying sugar liquors.

Of old, bone-char has been used for purifying sugar liquors. The ability of bone-char to draw the colouring matter out of the liquors is, however, comparatively low.

The object of this invention is to provide a new purifying means that possesses a high purifying ability and that at the same time can be easily regenerated.

According to this invention artificially produced silicic acid is used as a purifying means, which we have found able to draw out the colouring matter as well as unorganic matter in the liquors. Even such juices as molasses, which otherwise are difficult to decolorize, can be purified with the help of artificial silicic acid.

The necessary silicic acid can be produced in the well known way by treatment of a silicate, for instance sodium silicate, with an acid. The silicic acid received in this way is to be dried and crushed or granulated to different sizes according to the needs.

Such an artificial silicic acid can without danger be exposed to high temperatures. By experiments at a temperature of about 1000° F. we have found that the purifying ability of the silicic acid still is considerable, in spite of the percentage of water being much lowered. The percentage of water in the material, also including the chemically combined water, may consequently vary without preventing the use of the material for the stated purpose.

Due to these conditions, the used silicic acid can be regenerated without lessening its purifying ability. The regeneration can be done by washing, for instance with water, followed by heating.

The purifying and decolorizing are best carried out by forcing the sugar liquor from below through tanks filled with silicic acid. Thereupon, if necessary, the liquor may be passed through a filtering press.

We claim:

1. A process for producing pure sugar liquors consisting therein that the sugar liquor is forced through a layer or layers of a purifying means consisting of silicic acid, produced in the known way by treatment of an alkali silicate with an acid.

2. A process for producing pure sugar liquors consisting therein that the sugar liquor is forced through a layer or layers of a purifying means consisting of silicic acid, produced in the known way by treatment of an alkali silicate with an acid, the used silicic acid being afterwards regenerated by heating.

3. A process for producing pure sugar liquors consisting therein that the sugar liquor is forced through a layer or layers of a purifying means consisting of silicic acid, produced in the known way by treatment of an alkali silicate with an acid, the used silicic acid being afterwards regenerated by washing followed by heating.

4. A process for producing pure sugar liquors consisting therein that the sugar liquor is forced upwards from below through containers containing a layer or layers of a purifying means consisting of silicic acid, produced in the known way by treatment of an alkali silicate with an acid.

In witness whereof we have hereunto set our hands.

CARL FREDRIK KULLGREN.
SVEN GUSTAF LIND,